Sept. 1, 1959          H. MULDER          2,902,319

ADJUSTABLE WHEEL

Filed Aug. 28, 1957

INVENTOR.
HARRY MULDER
BY
J. William Freeman
ATTORNEY

United States Patent Office 2,902,319
Patented Sept. 1, 1959

2,902,319

ADJUSTABLE WHEEL

Harry Mulder, Akron, Ohio

Application August 28, 1957, Serial No. 680,747

11 Claims. (Cl. 301—128)

This invention relates to the art of wheel adjustment and in particular has reference to that type of adjustment wherein the axial spacing of the wheels on an axle may be varied.

In the known prior art of the adjustable wheel members, it has long been known the axial spacing of the wheels on an axle can be varied, with such variable spacing normally being utilized in tractor wheels designed for use in agricultural farming, for example. In the normal type of prior art device falling under this general classification, such adjustment is made by providing a special type of axle that preferably is equipped with a screw thread on the axial ends thereof to facilitate adjustment. It is then necessary in the normal case that the wheel be lifted off the ground and a threading or unthreading operation, as required, be effectuated to vary the axial position of the wheel on the axle. In still other types of prior art devices, it is necessary to completely remove the same wheel unit in order to facilitate axial adjustment of the same.

As a still further disadvantage of the known type of prior art of adjusting devices, it has been found that the same normally require the presence of a custom made axle to coact with the component parts of the device. This would of course preclude the possibility of use of such equipment on other than original equipment with no replacement market being available to devices of this general type.

While the above described types of prior art devices do in general perform the function of permitting axial shifting of the wheel with respect to the axle upon which the same is mounted, it is believed apparent that this adjustment is at best difficult and time consuming.

It has been found that the aforementioned disadvantages can be obviated by use of an adjustment screw that is adapted to coact with the wheel housing and the axle so that upon rotation of the adjusting nut, the wheel member will shift axially of the axial member without the necessity for removing or jacking of the wheel or axle respectively.

It accordingly becomes the principal object of this invention to provide an improved type of wheel and axle combination characterized by the fact that the wheel member can be shifted axially of the axle member without jacking or removal of the same.

It is a still further object of this invention to provide an improved type of adjustable wheel and axle assembly characterized by a simplicity of construction that results in an ease of operation.

These and other objects of the invention will become more apparent upon a reading of the following brief specification, considered and interpreted in the light of the accompanying drawings.

Figure 1:
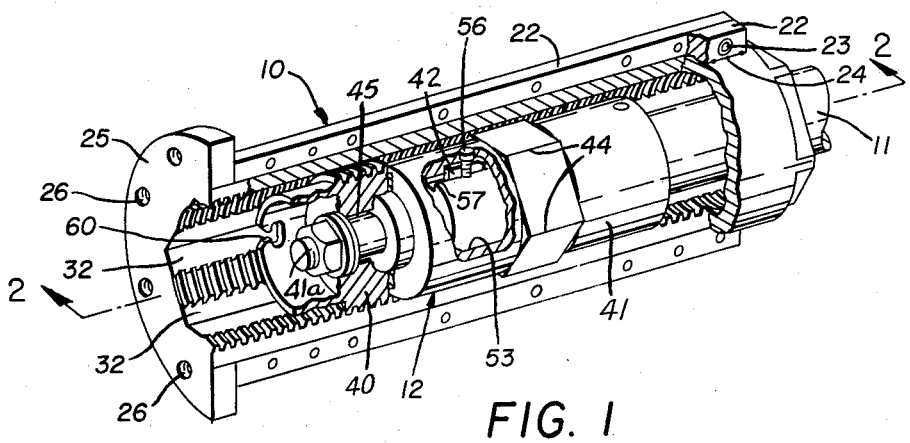
Figure 1 is a perspective view of the improved axle and wheel housing assembly.
Figure 2:
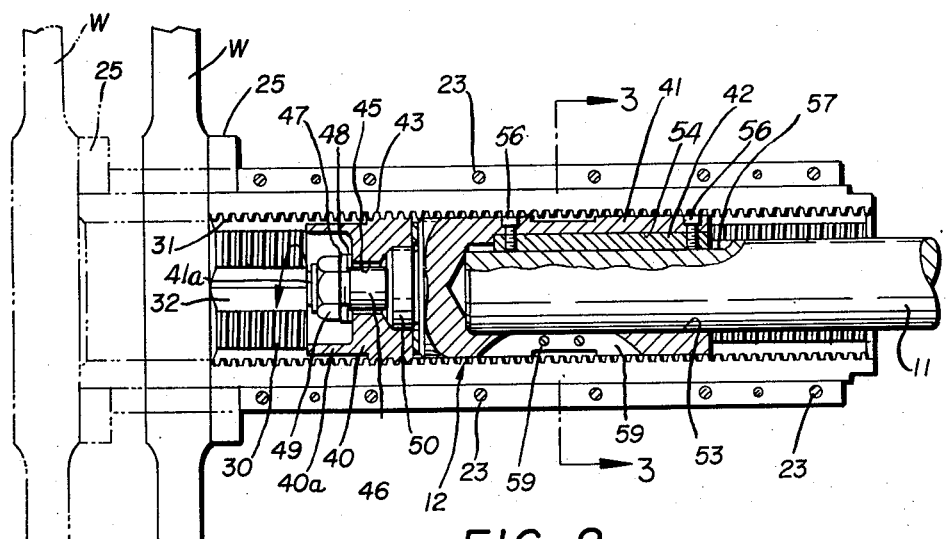
Figure 2 is a vertical sectional taken on the lines 2—2 of Figure 1.

Referring now to the drawings, and in particular to Figures 1 and 2 thereof, the improved adjustable wheel housing, generally indicated by the numeral 10, is shown telescoped in surrounding relationship with one axial end of an axle 11, with movement of the wheel housing 10 between the full and chain-dotted line positions of Figure 2 being effectuated by operation of adjusting means 12 that coact with the housing 10 and axle 11 as will be described.

Figure 3:
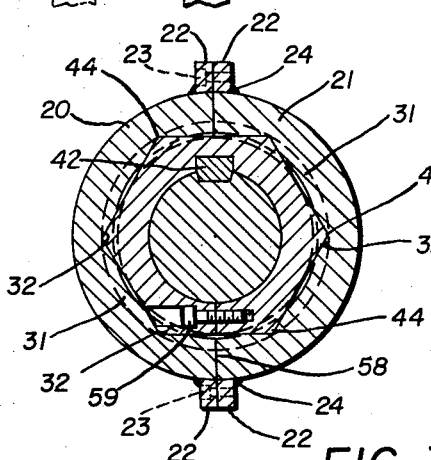
Figure 3 is a sectional view taken on the lines 3—3 of Figure 2.

Accordingly, and as best illustrated in Figure 1, the housing 10 is shown having an overall tubular configuration, with the housing 10, in the preferred embodiment of the invention, being defined by split semi-circular segments 20 and 21, and with each longitudinal edge of the sections 20 and 21 being provided with flange members 22, 22; the arrangement being such that flange members 22, 22 can be secured together as by bolts 23, 23, to define the tubular housing 10 that is illustrated in the drawings. Preferably in this regard, the flanges 22, 22 are secured to the members 21 and 22 as by welds 24 as is best shown in Figures 1 and 3 of the drawing. By like token, each semi-circular segment 20 and 21 further includes a radially extending flange 25, with this flange 25 including apertures 26, 26, through which may be passed the usual bolts (not shown) for securing a wheel member W thereto, as is shown in Figure 2 of the drawings. It is to be understood that a one-piece tubular construction could be employed for the housing structures if desired.

Additionally, the inboard external surface of the housing 10 may be flatted as shown in the drawings, with this arrangement being optional for facilitating manufacture of the split type housing described.

For the purpose of providing coaction between the axle 11 and housing 10, the adjusting surface 30, of the housing 10, is shown threaded as at 31, with threads 31 being radially interrupted by a series of longitudinally extending grooves 32, 32 of which 6 are shown in Figure 3 of the drawings. Although these grooves 32, 32 may be of any desired configuration for the purpose of achieving coaction with component parts of the adjusting means 12 as will be described, the same are shown in Figure 3 of the drawings as preferably being of V-shaped configuration so as to facilitate machining thereof as by a broaching operation.

Considering next the structure of the adjustment means 12, it will be seen that the same in reality is of three part configuration so as to include an adjusting nut 40, a driving sleeve 41, and a spline member 42; the arrangement being such that the adjusting nut 40 has peripheral threads 43 that are engageable with the previously described threads 31 of the housing 10, while the drive sleeve 41 has its external peripheral surface provided with a series of complementally V-shaped projections 44, 44 that are longitudinally received in the previously described V-shaped undercuts 32, 32.

Referring now to Figure 2, it will be seen that the adjusting nut 40 includes a central aperture 45 that is loosely positioned in encircling relationship to a reduced shank portion 46 of the driving sleeve 41 with thrust washers 47, 48, and nut 49, serving to axially secure the adjusting nut 40 on reduced shank portion 46. In this regard, it will be noted that the adjusting nut 40 surrounds reduced shank portion 50 of driving sleeve 41 with the interposed thrust washer limiting movement thereof to the right of Figure 2. Additionally, the sleeve portion 40a of nut 40 is provided with opposed slots 60, 60 (see Figure 1) to facilitate turning of the same relatively of housing 10 and axle 11 as will be described.

In order to facilitate telescopic reception of the axle 11, with respect to driving sleeve 41, the same (driving sleeve 41) is internally bored as at 53, with bore 53 being longitudinally slotted, as at 54, so as to receive spline key 42 and with bolts 56, 56, serving to secure the spline key 42 in undercut 54. It is believed apparent from the drawings that the axially outermost end of axle 11 includes the conventional key-way 57 that may receive the spline key 42 as is clearly shown in Figure 2 of the drawings.

While the aforementioned arrangement of component parts insures positive rotation of sleeve 41 and housing 10 upon rotation of axle 11, it is also necessary that means be provided for obviating axial shifting of sleeve 41 with respect to axle 11, it being clear that shifting between sleeve 41 and housing 10 is obviated by the provision of threads on adjusting nut 40.

Accordingly, and to this end, the sleeve 41 is shown longitudinally split, as at 58, so that bolts 59, 59 can be employed to draw the split portions together at the lowermost region of the sleeve 41 as is illustrated in Figures 2 and 3 of the drawings. It is of course believed apparent that other means could be employed to obviate axial shifting of the drive sleeve 41 on axle 11 if desired.

In use or operation of the improved adjustable wheel, it will first be assumed that the axle 11 has been provided with a key-way 57 adjacent its axle as is shown in Figure 2 of the drawings. It will further be assumed that the spline key 42 has been secured within the key-way 54 of drive sleeve 41. At this point, the drive sleeve 41 may be telescoped axially over the axle 11 with spline key 42 being received in key-way 57 of axle 11. Following such telescoping, the bolts 59, 59 may be inserted adjacent the split portion 58 of drive sleeve 41 as shown, and upon tightening of the same to the proper degree, the drive sleeve will be firmly positioned on the axle 11 so as to be fixed against relative axial or rotational movement therewith. At this time, the adjusting nut 40 may be passed over the exposed reduced shank portion 46 of drive sleeve 41 so as to have the aperture 45 thereof seat against the slightly larger shank portion 50. Upon completion of such positioning, thrust washers 47 and 48, as well as nut 49 may be attached to threaded end 41a of drive sleeve 41 so as to complete positioning of the adjusting nut 40, in a rotatable, but axially fixed, condition, on sleeve 41 shown in Figure 2.

With the driving means 12 thus assembled with respect to the axle 11 as just-described, the housing 10 may be positioned by aligning the split sections 20 and 21 around the adjusting nut 40 and the drive sleeve 41, with care being taken during this aligning operation to position the threads 43 and projections 44 in complemental engagement with the threads 31 and V-shaped grooves 32, respectively. When this condition has been achieved, the appropriate bolts may be passed between aligned apertures 23, 23 and at this point, the entire adjustable housing may be telescoped over to the axle 11. To complete the assembly, it is merely necessary that the wheel W be positioned against flange 25 as by passing conventional bolts through apertures 26, 26 for attachment to the conventional apertures provided in the wheel member W.

At such time as the above condition of the component parts is achieved, the device is ready for operation and it will be noted that upon rotation of the axle 11, similar rotation of wheel W will occur due to the positive drive effectuated by the drive sleeve 41. However, in the event that it is desired to axially adjust the spacing of the wheel W with respect to the axle 11, it is merely necessary that a turning tool (not shown) be inserted in either or both of the undercut slots 60 that are provided in the sleeve portion 40a of adjusting nut 40. Upon insertion of such a turning tool, followed by rotation of the same, it is believed apparent that the adjusting nut 40 will move axially of the housing 10. Such movement will result in an equivalent axial movement of the drive sleeve 41, with this movement being possible because of the complemental engagement of projections 42 with grooves 32 as has previously been described. When the desired degree of axial adjustment has been attained, it is merely necessary that the turning tool be removed, at which time re-use of the machine can be commenced.

It will be seen from the preceding that there has been provided a new and novel type of adjustable wheel mechanism that is characterized by the provision of an adjustment device having a minimal number of component parts and which is capable of utilization without jacking or removing of the wheel member.

Additionally, it is to be understood that if desired, in the case of manufacture of original equipment, that the outlined configuration of the driving sleeve per se could be built into the original axle with the result that the presence of an additional component part would not be required.

While a full and complete disclosure has been made in accordance with the dictates of the patent statutes, it is not intended that the invention be so limited. It is also to be understood that while an adjustable wheel of the type above described is shown provided on one end of an axle, that the same could also be provided with equal utility on the opposed end of the axle so as to permit adjustment of the wheels through a greater distance.

It accordingly follows that modifications of the invention may be resorted to without departing from the spirit hereof or the scope of the appended claims.

What is claimed is:

1. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve.

2. The device of claim 1 further characterized by the fact that said housing is defined by split sections releasably secured together at their edges.

3. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said means including a threaded interconnection between said nut and said housing.

4. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said means including a threaded connection between said peripheral surface of said nut and said internal wall of said housing.

5. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said means including a longitudinally extending rib and groove connection between said housing and said drive sleeve whereby said housing and said sleeve may move relatively of each other in an axial direction while rotating together about their concentric axis.

6. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said means including a longitudinally extending rib and groove connection between said housing and said drive sleeve whereby said housing and said sleeve may move relatively of each other in an axial direction while rotating together about their concentric axis; said rib and groove connection being defined by at least one rib projecting from the surface of said drive sleeve and being received in a complemental groove provided in the internal wall of said housing.

7. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said means including a threaded connection between said nut and said housing and a longitudinally extending rib and groove connection between said housing and said sleeve.

8. An adjustable wheel and axle combination of the character described, comprising; an axle having an external drive surface; a wheel housing telescoped over said drive surface and having an internal wall engaged thereby; an adjustment nut concentrically mounted on said axle in rotatable relationship therewith and being secured against movement axially of said axle and having a peripheral surface engaging said internal wall; and means for moving said wheel housing axially of said axle upon rotation of said adjustment nut.

9. An adjustable wheel and axle combination of the character described, comprising; an axle having an external drive surface; a wheel housing telescoped over said drive surface and having an internal wall engaged thereby; an adjustment nut concentrically mounted on said axle in rotatable relationship therewith and being secured against movement axially of said axle and having a peripheral surface engaging said internal wall; and means for moving said wheel housing axially of said axle upon rotation of said adjustment nut; said adjustment nut being accessible for turning from a point exteriorly of said housing.

10. In combination with an axle having a drive key; a drive sleeve telescoped over said axle for rotational driving therewith by said drive key; means for preventing axial movement between said sleeve and said axle; a series of longitudinally extending ribs defined by the external surface of said drive sleeve; an adjustment nut concentrically secured to said drive sleeve in rotatable, but axially fixed relationship therewith and having a threaded external surface; a wheel housing, concentrically telescoped over said axle, said drive sleeve and said nut and having a threaded internal bore engageable with said threaded surface of said nut; said threads of said bore being interrupted by a series of longitudinally extending grooves within which said ribs may be received.

11. An adjustable wheel and axle combination of the character described, comprising; an axle; a drive sleeve secured to said axle and being movable therewith; a wheel housing telescoped over said drive sleeve and having an internal wall engaged therewith in nonrotatable relationship; an adjustment nut rotatably journaled on said drive sleeve in concentricity with said axle, said sleeve and said housing; said nut having an external peripheral surface rotatably engaged with said internal wall of said housing; and means for moving said wheel housing axially of said drive sleeve upon rotation of said adjustment nut relatively of said drive sleeve; said sleeve being split along at least a portion of its longitudinal length and including draw bolts to draw said split portions together into contact with said axle.

References Cited in the file of this patent

UNITED STATES PATENTS

| | | |
|---|---|---|
| 1,447,011 | Brandt et al. | Feb. 27, 1923 |
| 2,676,849 | Houch et al. | Apr. 27, 1954 |